Patented Apr. 21, 1953

2,636,043

UNITED STATES PATENT OFFICE 2,636,043

METHOD OF PREPARING 16-KETOSTEROIDS

Max N. Huffman, Oklahoma City, Okla., assignor to G. D. Searle & Co., Chicago, Ill., a corporation of Illinois No Drawing. Application August 31, 1951, Serial No. 244,713

18 Claims. (Cl. 260—397.4)

This invention pertains to the conversion of α-ketols to ketones. More specifically, it relates to the synthesis of 16-ketosteroids having a 16,17-dihydro - 15H - cyclopenta[a]polyhydrophenanthrene nucleus. Particularly this invention relates to the removal of a 17-hydroxy group by the treatment with zinc and acid of a steroid with the following structure in ring D

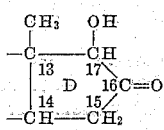

to form the 17-desoxy-16-ketone of the type

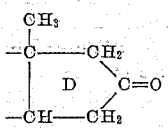

In my copending application, Serial No. 84,261, filed March 29, 1949, of which the present application is a continuation-in-part, I have shown that when a $\Delta^{1,3,5}$-estratriene of the formula

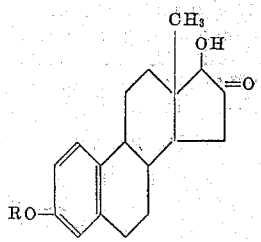

is reduced with zinc and acid, there occurs the unexpected formation of the corresponding 16-keto-17-desoxy compound.

I have now found that this method is one of general applicability and can be applied to α-ketols of all types. It is of particular interest for the removal of a 17-hydroxy group in the formation of 16-ketosteroids with different types of nuclear unsaturation and even in the production of the fully saturated 1,2,3,4,5,6,7,8,9,10,11,12,13,14,16,17-hexadecahydro - 15H - cyclopenta[a]-phenanthrenes.

The reductions are generally carried out in an organic solvent suitable for Clemmensen reductions. Water-soluble solvents such as methanol, ethanol, propanol, isopropanol, and dioxane are suitable as are water-insoluble solvents such as benzene, toluene, and other hydrocarbons boiling in the range of 50–150° C. The reactions are generally conducted at temperatures in the range of 50–150° C. over periods of about 3 to 10 hours. Generally concentrated hydrochloric acid is used in the reductions, but acid as dilute as 5% and as concentrated as 40% may be used. The form of the zinc is not critical. It is preferably amalgamated by reaction with its weight of a 5–10% mercuric chloride solution in very dilute hydrochloric acid.

The 16-ketosteroids can generally be obtained from the reaction medium by extraction with an organic solvent and removal of the impurities by washing with water, dilute alkali and dilute acid, followed by evaporation of the organic solvent to yield the desired substances, generally in a crystalline form. If the product thus obtained is not sufficiently pure, these ketones can be converted to such adducts as semicarbazones, oximes, arylhydrazones, trimethylaminoacetohydrazones and related substances. These adducts are then purified and hydrolyzed to the original ketones by an agent such as a dilute acid.

It will be recognized that the reaction conditions described herein correspond to those of a mild Clemmensen reduction (cf. Organic Reactions, volume 1, page 155 et seq., 1942). However, while the typical Clemmensen reductions operate to change a ketone group to a methylene group, I have now found that, unless the reaction is carried too far, it functions as an effective method for the removal of an α-hydroxyl radical from a ketol. This process makes available by a practical synthetic method valuable chemical intermediates and compounds of medicinal value.

The method is applicable to steroid nuclei of various degrees of saturation. Thus it can be used for the preparation of 16-equilenone, which has a naphthalene structure in rings A and B, as well as to 16-isoandrosterone which has a completely saturated nucleus. It is of particular importance that this method offers a means for selective removal of the 17-hydroxy group from steroids which contain hydroxy groups in other positions of the nucleus. The process is likewise applicable to the 16-keto-16,17-dihydro-15H-cyclopenta[a]polyhydrophenanthrenes containing such nuclear substituents in rings A, B and C as lower hydrocarbon, ether and ester substituents.

My invention will appear more fully from the following experimental part. It will be understood, however, that these examples are set forth by way of illustration only and that the invention is not to be construed as limited in spirit or in scope by the details contained therein. It will be apparent to those skilled in the art that many modifications in materials and methods can be made without departing from the scope of the invention.

In the following examples, temperatures are given uncorrected in degrees centigrade (C.), and quantities in grams (g.), milligrams (mg.), and milliliters (ml.).

*Example 1*

603 milligrams of 16-keto-α-estradiol are dissolved in 45 ml. of 95% ethanol containing 2 ml.

of 6 N hydrochloric acid. To this solution is added amalgamated zinc (prepared from 15 g. of 20-mesh zinc) and the resulting mixture is refluxed for 5 hours, with the addition of 3 ml. portion of 6 N hydrochloric acid at each 15-minute interval. At the end of 3 hours of refluxing, 11 ml. of ethanol are added. At the end of the 5-hour period the mixture is cooled, treated with 750 ml. of ether and 700 ml. of water. The ether layer is separated, washed with water, with 3% sodium bicarbonate solution, and then twice with water. The solution is dried and evaporated, yielding a white crystalline residue, which is treated with 0.60 g. of semicarbazide hydrochloric acid and 0.84 g. of crystalline sodium acetate in 36 ml. of ethanol and 4 ml. of water. The mixture is refluxed for one hour and then 25 ml. of water are added. On chilling and standing for two days the crystalline semicarbazone is removed by filtration, washed copiously with water, and recrystallized from hot methanol. The purified crystalline semicarbazone of $\Delta^{1,3,5}$-estratrien-3-ol-16-one is removed by filtration, washed with 50% methanol and with water, and dried. The product so obtained melts at 244.5–247° C. Further recrystallization from 95% ethanol and from a mixture of chloroform and absolute ethanol and then twice from absolute ethanol, gives material melting with decomposition at 246.5–248° C.

Example 2

220 mg. of the semicarbazone of $\Delta^{1,3,5}$-estratrien-3-ol-16-one are dissolved in 75 ml. of ethanol and 25 ml. of 2 N hydrochloric acid. The solution is refluxed gently for 2 hours. Then 5 ml. of pyruvic acid in 20 ml. of water are added to the hot solution with thorough mixing. The resulting solution is left for about 15 hours at room temperature. It is then diluted with ether and the ethereal solution is washed with water, with dilute hydrochloric acid, twice with 5% sodium carbonate solution and finally twice with water. The ether solution is dried and evaporated, yielding a crystalline white residue of $\Delta^{1,3,5}$-estratrien-3-ol-16-one. This material is recrystallized from aqueous methanol using activated charcoal and gives tiny fine white needles which melt at 242.5–243.5° C. (with decomposition). Further recrystallization from absolute methanol raises the melting point to 243.5–245.5° C. (with decomposition).

Example 3

37 mg. of $\Delta^{1,3,5}$-estratrien-3-ol-16-one dissolved in 30 ml. of warm N/2 sodium hydroxide solution are cooled and treated with 0.50 ml. of benzoyl chloride, and the mixture is shaken vigorously for 10 minutes. After 24 hours at room temperature the benzoate is removed by filtration, washed well with water, and dried. On recrystallization from a mixture of acetone and ethanol fine needles of $\Delta^{1,3,5}$-estratrien-3-ol-16-one benzoate melting at 223.5–224.5° C. (with slight decomposition) are obtained.

Example 4

48 mg. of $\Delta^{1,3,5}$-estratrien-3-ol-16-one in 1 ml. of dry pyridine are treated with 1 ml. of acetic anhydride. The reaction mixture is kept at room temperature for 24 hours with occasional agitation. It is then diluted with 50 ml. of ice cold water, thoroughly mixed and left at room temperature for several hours. The crude acetate which precipitates is removed by filtration, washed thoroughly with water, and dried. It is recrystallized from aqueous methanol and once from absolute methanol, using activated charcoal. The acetate of $\Delta^{1,3,5}$-estratrien-3-ol-16-one thus obtained melts at 132–133° C.

Example 5

53 mg. of $\Delta^{1,3,5}$-estratrien-3-ol-16-one in dry pyridine is reacted with 0.50 ml. of palmitoyl chloride. A white thick precipitate forms at once with the evolution of heat. The reaction mixture is diluted further with 1.5 ml. of dry pyridine and agitated continuously for 15 minutes. Then 0.25 ml. of water is added. The mixture is agitated for an additional 5 minutes and then diluted with 40–50 ml. of cold water. After 24 hours at room temperature the precipitate of $\Delta^{1,3,5}$-estratrien-3-ol-16-one palmitate containing some palmitic acid is removed by filtration, washed well with water, and dried in vacuum. Several recrystallizations from ethanol afford the crystalline $\Delta^{1,3,5}$-estratrien-3-ol-16-one palmitate as waxy plates melting at 110.5–111.5° C.

Example 6

50 mg of $\Delta^{1,3,5}$-estratrien-3-ol-16-one are covered with a solution of 4 g. of 85% potassium hydroxide in 9 ml. of water. The mixture is agitated, cooled, and treated with 1 ml. of methanol. It is then heated on the steam bath, treated with 1 ml. of dimethyl sulfate and, after the reaction subsides, with an additional 1 ml. of dimethyl sulfate. The mixture is refluxed for 15 minutes and then 5 ml. of water are added. After 24 hours standing at room temperature the precipitate of the crude methyl ether of $\Delta^{1,3,5}$-estratrien-3-ol-16-one is removed by filtration, washed thoroughly with water, and then recrystalized from aqueous acetone using decolorizing charcoal. A second crystallization from aqueous methanol gives plates of the 3-methoxy-$\Delta^{1,3,5}$-estratrien-16-one melting at 124–125° C. Further recrystallization from 80% methanol gives colorless plates melting sharply at 124–124.5° C.

Example 7

50 mg. of $\Delta^{1,3,5}$-estratrien-3-ol-16-one are covered with 113 mg. of anhydrous potassium carbonate and then 0.10 ml. of benzyl chloride in 2.5 ml. of 95% ethanol added. The mixture is refluxed on the steam bath for 1.5 hours and then 0.6 ml. of water added. The mixture is chilled and the precipitate of the benzyl ether of $\Delta^{1,3,5}$-estratrien-3-ol-16-one is collected on a filter after a day in the refrigerator, washed with cold 75% ethanol, and then with water and dried. The 3-benzyloxy-$\Delta^{1,3,5}$-estratrien-16-one is then recrystallized several times from 95% ethanol and forms silky needles melting at 156–156.5° C.

Example 8

To 179 mg. of $\Delta^{1,3,5}$-estratrien-3-ol-16-one benzoate are added 500 mg. of anhydrous sodium sulfate and 250 mg. of freshly fused zinc chloride. The mixture is covered at once with 10 ml. of ethyl mercaptan. The flask is stoppered and the mixture is thoroughly agitated. The benzoate soon dissolves with a development of a pink color. After 3 days standing in the refrigerator the mixture is evaporated under vacuum at 30° C. in order to remove excess mercaptan. The residue is treated with 200 ml. of 1 N sodium hydroxide and 200 ml. of ether. The resulting mixture is thoroughly agitated and the ether layer is separated, and washed twice with water containing a trace of pyridine. The ether solution is then dried and to it are added 1 ml. of pyridine, 25 ml. of absolute ethanol, and 30 ml. of benzene. The resulting solution is evaporated to a volume of a few ml. on the steam bath. The resulting oily residue, which is rich in pyridine, is dissolved in 10 ml. of acetone and the resulting solution is diluted with 50 ml. of water. After 4 days in the refrigerator the diethyl thioacetal of $\Delta^{1,3,5}$-estratrien-3-ol-16-one separates as an oil. This oil is removed and dried thoroughly in vacuum over concentrated sulfuric acid.

*Example 9*

To the oily thioacetal of Example 8 are added 3 g. of Raney nickel catalyst (saturated with hydrogen) and 30 ml. of absolute alcohol. The mixture is refluxed for 7 hours on the steam bath, cooled, and filtered to remove catalyst. To the filtrate are added 30 ml. of 2 N potassium hydroxide and the alkaline solution is refluxed for 45 minutes. The resulting solution is evaporated to remove a portion of the alcohol. The remaining alkaline solution is acidified with dilute hydrochloric acid and then taken up in ether. The ether solution is washed with water, twice with 3% sodium carbonate solution and finally twice with water. The ether solution is dried and evaporated, yielding an oil which soon crystallizes. The crystalline material is treated with carboxymethoxylamine to remove any ketonic material. The resulting non-ketonic fraction is crystallized twice from aqueous ethanol to give 77 mg. of desoxoestrone melting at 133–134° C. This material did not depress the melting point of authentic desoxoestrone.

39 mg. of the desoxoestrone obtained above are dissolved in 2 ml. of dry pyridine and treated with 0.5 ml. of benzoyl chloride. There is obtained in this manner long needles of the crystalline desoxoestrone benzoate which melt at 169–169.5° C., after recrystallization from a mixture of acetone and methanol. This product did not depress the melting point of authentic desoxoestrone benzoate.

*Example 10*

A solution of 4.25 g. of potassium in 175 ml. of dry tert-butanol is added to 4 g. of 17-isoandroster-one (3β-hydroxy-androstan-17-one). To the resulting solution an initial portion of 4 ml. of isoamyl nitrite is added and, after stirring for 2.5 hours, an additional portion of 3.0 ml. of amyl nitrite. Stirring is continued for 2.5 hours longer after which the mixture is treated with 1000 ml. of ice water and 1750 ml. of ether. Then 750 ml. of glycine hydrochloride (containing 85 g. of glycine and 38 ml. of concentrated hydrochloric acid) are added and the mixture is at once partitioned. The ether layer is separated and washed with 1000 ml. of 3% sodium bicarbonate and the nitroso compound is extracted using N/2 potassium hydroxide. The alkaline extract is rendered acid by addition of concentrated hydrochloric acid and left standing for 12 hours. A precipitate forms which is collected on a filter, washed copiously with water and dried in a vacuum. The 16-oximino-17-isoandrosterone thus obtained melts at about 213–215° C. with decomposition. A sample, recrystallized from methanol, sintered slightly at about 212° C., browned at 215.5° C. and decomposed with gas formation at about 218–219.5° C.

3.505 g. of 16-oximinoisoandrosterone are covered with 232 ml. of 50% acetic acid, treated with 9.3 g. of zinc dust and refluxed for 75 minutes. After cooling to room temperature the solution is decanted from the zinc and the zinc is rinsed twice with 15 ml. of acetic acid. The filtrates are diluted with 131 ml. of water and stored at 0° C. The resulting precipitate is washed with water, dissolved in 350 ml. of hot methanol and 200 ml. of water. This solution is distilled and the 3β,17 - dihydroxyandrostan - 16 - one crystallized in the hot. The precipiate is collected on a filter, washed well with water and dried, whereupon it melts at about 208.5–210° C. Upon repeated recrystallization from 50% methanol colorless crystals are obtained which melt sharply at 217–218° C. and turn yellow on melting.

*Example 11*

0.902 g. of 3β,17-dihydroxyandrostan-16-one melting at about 210–212° C., are dissolved in 90 ml. of 95% ethanol. To this solution amalgamated zinc is added, prepared from 23 g. of 20-mesh zinc, 2.3 g. of mercuric chloride, 45 ml. of water and 3.1 ml. of 6 N hydrochloric acid. The mixture is heated at reflux temperature on a water bath for 30 minutes and then for an additional 5 hours with the addition of 4.5 ml. portions of 6 N hydrochloric acid at each 15-minute interval. After cooling the mixture is added to 800 ml. of 0.25 N hydrochloric acid and 800 ml. of benzene. The benzene layer is separated and washed twice with 500 ml. of 1 N sodium hydroxide and twice with 500 ml. of water. The benzene solution is then evaporated, the residue, is taken up in methanol and the methanol solution evaporated.

To the residue are added 10 g. of trimethylaminoacetohydrazide hydrochloride (Girard's reagent "T"), 10 ml. of glacial acetic acid and 90 ml. of absolute ethanol. The mixture is heated at reflux temperature on the steam bath for 1 hour, moisture being excluded by use of a calcium chloride tube. After chilling at 0° C. the mixture is added to 800 ml. of ice water and 6 g. sodium hydroxide and extracted at once with 800 ml. of ether. The ether phase, being non-ketonic, is discarded.

The aqueous phase, containing the trimethylaminoacetohydrazone of 16-isoandrosterone is hydrolyzed with 62 ml. of concentrated hydrochloric acid, left standing for 12 hours and then extracted with 800 ml. of ether. This ether extract is washed successively with water, 1 N sodium hydroxide and water. The ether solution is then evaporated and the residue is recrystallized repeatedly from 50% methanol and finally from a mixture of acetone and petroleum ether. The 16-isoandrosterone thus obtained melts at about 186–186.5° C. and has the structural formula

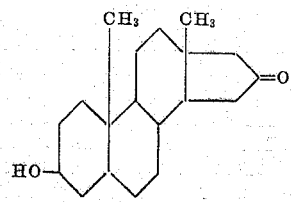

*Example 12*

A solution of 53 mg. of 16-isoandrosterone in 2 ml. of dried pyridine is treated at room temperature with 0.5 ml. of benzoyl chloride. After 24 hours the volume is increased to 50 ml. by addition of ice water and, after mixing, the material is stored in the ice box. A reddish oil appears which is separated and dried in a vacuum. Upon repeated recrystallizations from acetone and from ethanol, small feathery needles of 3β-benzoyloxy-androstan-16-one are obtained which melt at 208.5–209° C.

Example 13

A mixture of 46 mg. of 16-isoandrosterone, 100 mg. of crystalline sodium acetate, 50 mg. of hydroxylamine hydrochloride, 4.5 ml. of 95% ethanol and 0.5 ml. of water is heated gently on the steam bath for 2 hours and then stored at 0° C. The precipitated oxime is collected on a filter and washed well with water. It melts at about 198.5–199.5° C. with slight decomposition. Upon recrystallization from dilute methanol and decolorization with charcoal, fine white needles are obtained which melt sharply at about 199° C. without decomposition.

Example 14

530 mg. of 3-benzyloxy-Δ$^{1,3,5}$-estratrien-17-ol-16-one, melting at 196–198° C., are dissolved in a solution of 1.3 ml. of 6 N hydrochloric acid in 30 ml. of 95% ethanol. To this solution is added zinc amalgam prepared from 10 g. of 20-mesh zinc and the resulting mixture is refluxed for 5 hours with the addition of 2 ml. portions of 6 N hydrochloric acid at each 15-minute interval. At the end of 2 hours 10 ml. of ethanol are added. After completion of the addition of the hydrochloric acid the mixture is cooled, treated with 500 ml. of ether and 500 ml. of water. The ether layer is separated and washed first with water, then with 3% sodium bicarbonate solution, and then again with water. Upon drying and evaporation a white crystalline residue is obtained.

To this residue are added 7 g. of trimethylaminoacetohydrazide hydrochloride in 7 ml. of glacial acetic acid and 60 ml. of absolute ethanol and the mixture is refluxed for an hour with exclusion of moisture. After cooling the reaction product is poured into a solution of 4 g. of sodium hydroxide in 500 ml. of ice water and then extracted with 500 ml. of ether.

The aqueous solution of the trimethylaminoacetohydrazone of 3-benzyloxy-Δ$^{1,3,5}$-estratrien-16-one is hydrolyzed with hydrochloric acid and the hydrolysate extracted with ether. The ether extract is washed with water, dilute sodium hydroxide and again with water and finally evaporated. Upon repeated recrystallization from 95% ethanol the 3-benzyloxy-Δ$^{1,3,5}$-estratrien-16-one is obtained in the form of colorless crystals melting at about 154–156° C.

Example 15

A solution of 1 g. of 3β, 17-dihydroxy-Δ$^{5-6}$-androsten-16-one in 100 ml. of ethanol is treated with zinc amalgam prepared from 25 g. of zinc, 2.5 g. of mercuric chloride, 50 ml. of water and 3.4 ml. of 6 N hydrochloric acid. The resulting mixture is heated at reflux temperature for 30 minutes and then for an additional 5 hours with the addition of 5 ml. portions of 6 N hydrochloric acid at 15-minute intervals. The reaction product is cooled and treated with 1 liter of hydrochloric acid and 1 liter of benzene. The benzene layer is separated and washed with 1 N potassium hydroxide and water and finally evaporated. The residue is taken up in methanol and upon evaporation of the methanol, white crystals are obtained. Purification by way of the trimethylaminoacetohydrazone yields pure 3β-Δ$^{5-6}$-androsten-16-one.

This same process is likewise applicable to the conversion of 17-hydroxyequilen-16-one to equilen-16-one and of 3,17-dihydroxyequilen-16-one to 3-hydroxy-equilen-16-one.

I claim:

1. The process of producing a 16-ketosteroid containing a 16,17-dihydro-15H-cyclopenta-[a] polyhydrophenanthrene nucleus which comprises treatment of the 17-hydroxy derivative of such a 16-ketosteroid with zinc and acid to remove the 17-hydroxy group.

2. The process of producing a 16-ketosteroid containing a 16,17-dihydro-15H-cyclopenta-[a] polyhydrophenanthrene nucleus which comprises treatment of the 17-hydroxy derivative of such a 16-ketosteroid with zinc and hydrochloric acid to remove the 17-hydroxy group.

3. The process of producing a 16-ketosteroid containing an androstane nucleus which comprises treatment of a 17-hydroxy derivative of such a 16-ketosteroid with zinc and hydrochloric acid to remove the 17-hydroxy group.

4. The process of preparing a 16-keto-androstane containing in the 3-position a monovalent oxygen-function of the type —OR, wherein R is a member of the class consisting of hydrogen, lower acyl and lower hydrocarbon, which comprises treatment of the 17-hydroxy derivative of such a 16-ketosteroid with zinc and hydrochloric acid to remove the 17-hydroxy group.

5. The process of preparing a 3-hydroxy-16-keto-androstane which comprises reacting a 3,17-dihydroxy-16-keto-androstane with zinc and hydrochloric acid.

6. The process of preparing a 3β-hydroxy-16-keto-androstane which comprises reacting a 3β,17-dihydroxy-16-keto-androstane with zinc and hydrochloric acid.

7. The process of preparing a 3β-hydroxy-16-keto-androstane which comprises reacting a 3β,17-dihydroxy-16-keto-androstane with amalgamated zinc and hydrochloric acid.

8. The process of producing a 16-ketosteroid containing a Δ$^{1,3,5}$-estratrien nucleus which comprises treatment of a 17-hydroxy derivative of such a 16-ketosteroid with zinc and hydrochloric acid to remove the 17-hydroxy group.

9. The process of preparing a 16-keto-Δ$^{1,3,5}$-estratrien containing in the 3-position a monovalent oxygen-function of the type —OR, wherein R is a member of the class consisting of hydrogen, lower acyl and lower hydrocarbon, which comprises treatment of the 17-hydroxy derivative of such a 16-ketosteroid with zinc and hydrochloric acid to remove the 17-hydroxy group.

10. The process of producing a 16-ketosteroid of the formula

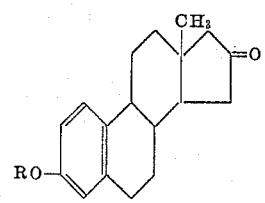

wherein R is a member of the group consisting of hydrogen and lower hydrocarbon radicals, which comprises reacting a 16-keto-17-hydroxy-steroid of the formula

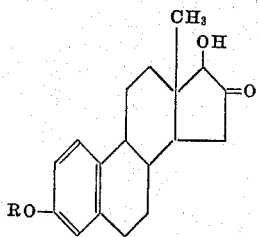

with zinc and hydrochloric acid and separating the 16-ketosteroid thus formed.

11. The process of claim 10 wherein R represents hydrogen.

12. The process of claim 11 wherein the zinc is amalgamated zinc.

13. The process of claim 12 wherein the reaction is conducted in aqueous alcohol.

14. The process of claim 13 wherein the 16-ketosteroid is separated by means of its semicarbazone.

15. The process of claim 14 wherein the starting material is 16-keto-α-estradiol.

16. The process of producing $\Delta^{1,3,5}$-estratrien-3-ol-16-one which comprises reacting 16-keto-α-estradiol with zinc amalgam and hydrochloric acid in aqueous alcohol at reflux temperature, separating the steroidal material, reacting said steroidal material with semicarbazide in aqueous alcohol, separating the crystalline semicarbazone of $\Delta^{1,3,5}$-estratrien-3-ol-16-one, hydrolyzing said semicarbazone, and isolating the $\Delta^{1,3,5}$-estratrien-3-ol-16-one.

17. The process of producing a 16-ketosteroid containing a $\Delta^{5-6}$-dehydroandrostane nucleus which comprises treatment of a 17-hydroxy derivative of such a 16-ketosteroid with zinc and hydrochloric acid to remove the 17-hydroxy group.

18. The process of producing a 16-ketosteroid containing an equilenin nucleus which comprises treatment of a 17-hydroxy derivative of such a 16-ketosteroid with zinc and hydrochloric acid to remove the 17-hydroxy group.

MAX N. HUFFMAN.

No references cited.